US011118731B2

(12) United States Patent
Plow et al.

(10) Patent No.: US 11,118,731 B2
(45) Date of Patent: Sep. 14, 2021

(54) APPARATUS AND METHOD FOR COOLING A HIGH HEAT-GENERATING COMPONENT OF A VEHICLE (71) Applicant: Bendix Commercial Vehicle Systems LLC, Elyria, OH (US)

(72) Inventors: William Plow, Avon Lake, OH (US); Stephen Howe, Cuyahoga Falls, OH (US); Mark A Matko, North Olmsted, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 318 days.

(21) Appl. No.: 16/376,490

(22) Filed: Apr. 5, 2019

(65) Prior Publication Data
US 2020/0318788 A1    Oct. 8, 2020

(51) Int. Cl.
| *F02C 6/16* | (2006.01) |
| *F01P 3/20* | (2006.01) |
| *F01P 5/02* | (2006.01) |
| *F16N 39/02* | (2006.01) |
| *F04C 29/04* | (2006.01) |
| *F25B 1/00* | (2006.01) |
| *F01P 3/12* | (2006.01) |
| *F01M 5/00* | (2006.01) |

(52) U.S. Cl.
CPC .............. *F16N 39/02* (2013.01); *F01P 3/12* (2013.01); *F01P 3/20* (2013.01); *F04C 29/04* (2013.01); *F25B 1/00* (2013.01); *F01M 2005/004* (2013.01); *F01P 2060/02* (2013.01); *F01P 2060/04* (2013.01); *F16N 2210/16* (2013.01)

(58) Field of Classification Search
CPC ......... F02C 6/16; F02C 7/185; F01P 2060/02; F01P 3/20; F01P 2070/04; F01P 5/02; F01P 9/00
See application file for complete search history.

(56) References Cited

U.S. PATENT DOCUMENTS

| 5,428,963 | A | * | 7/1995 | Korycki | .................. | B01D 8/00 |
| | | | | | | 62/272 |
| 6,031,751 | A | * | 2/2000 | Janko | ...................... | F28F 13/00 |
| | | | | | | 363/144 |
| 6,223,558 | B1 | * | 5/2001 | Yi | ......................... | B01D 53/002 |
| | | | | | | 62/623 |
| 2007/0221145 | A1 | * | 9/2007 | Forner | ...................... | F02G 5/04 |
| | | | | | | 123/41.01 |
| 2009/0025908 | A1 | * | 1/2009 | Samanta | ................ | F02M 31/14 |
| | | | | | | 165/104.19 |
| 2015/0128575 | A1 | * | 5/2015 | Schmitt | ................. | F01N 3/0205 |
| | | | | | | 60/286 |
| 2016/0169082 | A1 | | 6/2016 | Contaldi | | |
| 2018/0238215 | A1 | * | 8/2018 | Kulkarni | ............... | F01N 3/0211 |
| 2019/0211827 | A1 | * | 7/2019 | Kovacsik | ................ | F04C 29/04 |

FOREIGN PATENT DOCUMENTS

WO    WO2013042142 A1    3/2013

* cited by examiner

*Primary Examiner* — Long T Tran
(74) *Attorney, Agent, or Firm* — Cheryl Greenly; Brian Kondas; Eugene Clair (57) ABSTRACT An apparatus is provided for cooling a high heat-generating vehicle component having a coolant loop. The apparatus comprises an air compressor assembly including a heat-sinking portion that can be thermally coupled to the coolant loop to transfer heat energy away from the coolant loop to enhance cooling of the vehicle component.

47 Claims, 9 Drawing Sheets

APPARATUS AND METHOD FOR COOLING A HIGH HEAT-GENERATING COMPONENT OF A VEHICLE

BACKGROUND

The present application relates to vehicle cooling systems, and is particularly directed to an apparatus and cooling method for cooling a high heat-generating vehicle component.

A high heat-generating vehicle component usually has a cooling system that is either air-cooled or liquid-cooled. The typical cooling system has a pump and a radiator through which hot coolant fluid (either a gas or a liquid) from the vehicle component is pumped to cool the hot coolant fluid. The heat transferred from the coolant fluid to the radiator is then radiated to atmosphere. Accordingly, those skilled in the art continue with research and development efforts in the field of cooling systems for high heat-generating vehicle components.

SUMMARY

In accordance with one embodiment, an apparatus is provided for cooling a high heat-generating vehicle component having a coolant loop. The apparatus comprises an air compressor assembly including a heat-sinking portion that can be thermally coupled to the coolant loop to transfer heat energy away from the coolant loop to enhance cooling of the vehicle component.

In accordance with another embodiment, an apparatus is provided for cooling a high heat-generating vehicle component. The apparatus comprises an air compressor assembly. The air compressor assembly includes a reservoir containing a liquid, and a heat exchanger submerged at least in part in the liquid contained in the reservoir. The air compressor assembly also includes an inlet port connected to one end of the heat exchanger and for receiving hot coolant from the vehicle component. The air compressor assembly further includes an outlet port connected to an opposite end of the heat exchanger and for returning coolant that has been cooled by the heat exchanger back to the vehicle component.

In accordance with another embodiment, an apparatus is provided for cooling a high heat-generating vehicle component. The apparatus comprises an air compressor assembly. The apparatus also comprises means interconnecting the vehicle component and the air compressor assembly and for enabling heat energy to be transferred away from the vehicle component and dissipated within the air compressor assembly.

In accordance with another embodiment, an apparatus is provided for cooling at least one high heat-generating vehicle component. The apparatus comprises a first high heat-generating vehicle component. The apparatus also comprises an air compressor assembly including a heat-sinking portion coupled to the first high heat-generating vehicle component such that the heat-sinking portion increases in temperature due to heat energy transferred from the first high heat-generating component to the heat-sinking portion.

In accordance with another embodiment, a method is provided for a vehicle. The method comprises passing a fluid through a high heat-generating component of the vehicle to allow heat energy to be transferred from the high heat-generating component to the fluid to provide a heated fluid. The method also comprises directing the heated fluid to an air compressor assembly of the vehicle. The method further comprises passing the heated fluid through the air compressor assembly to allow heat energy to be transferred from the heated fluid to the air compressor assembly to provide a cooled fluid. The method also comprises directing the cooled fluid from the air compressor assembly to the high heat-generating component to return the fluid back to the high heat-generating component.

In accordance with another embodiment, a method is provided for a vehicle. The method comprises lowering an operating temperature of a high heat-generating component of the vehicle by transferring heat energy away from the high heat-generating component. The method also comprises raising an operating temperature of an air compressor assembly of the vehicle by sinking the heat energy that has been transferred away from the high heat-generating component.

In accordance with another embodiment, an apparatus is provided for cooling a high heat-generating vehicle component. The apparatus comprises an air compressor assembly operable in a heat-generating mode in which the air compressor assembly has a relatively lower capability to absorb heat energy from the vehicle component to provide cooling of the vehicle component, and a non-heat-generating mode in which the air compressor has a relatively higher capability to absorb heat energy from the vehicle component to provide enhanced cooling of the vehicle component.

In accordance with another embodiment, an apparatus is provided for cooling a high heat-generating vehicle component. The apparatus comprises an air compressor assembly for (i) absorbing less heat energy from the vehicle component to decrease cooling of the vehicle component when component parts of the air compressor assembly are delivering compressed air, and (ii) absorbing more heat from the vehicle component to increase cooling of the vehicle component when component parts of the air compressor assembly are not delivering compressed air.

In accordance with another embodiment, an apparatus is provided for enhancing cooling of a high heat-generating vehicle component that is cooled by a primary cooling mechanism. The apparatus comprises an air compressor assembly comprising a structure which provides a secondary cooling mechanism that augments cooling of the vehicle component by the primary cooling mechanism.

In accordance with another embodiment, an apparatus comprises a primary cooling mechanism for cooling a high heat-generating vehicle component other than a component of an air compressor assembly. The apparatus also comprises a secondary cooling mechanism for augmenting cooling of the high heat-generating vehicle component, wherein the second cooling mechanism is thermally coupled to the primary cooling mechanism and comprises a heat-absorbing portion of an air compressor assembly.

In accordance with another embodiment, an air compressor assembly comprises a reservoir containing a liquid for (i) absorbing heat energy generated by component parts of the air compressor assembly during operation of the air compressor assembly, and (ii) absorbing heat energy generated by component parts of a vehicle component during operation of the vehicle component.

DETAILED DESCRIPTION

Figure 1:
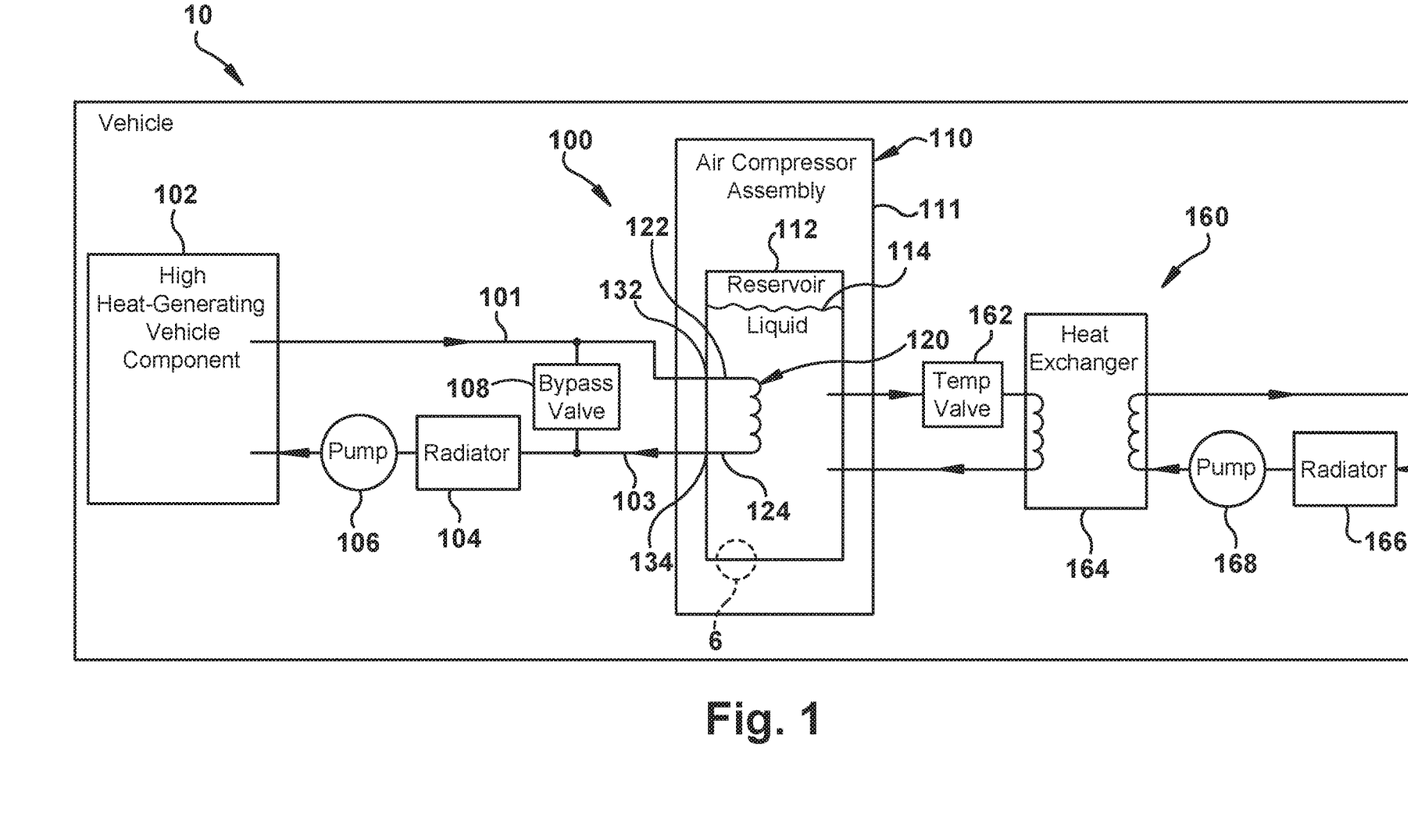
FIG. 1 is a schematic diagram of an example vehicle component cooling apparatus including an air compressor assembly constructed in accordance with an embodiment.

Referring to FIG. 1, a schematic diagram of an example vehicle component cooling apparatus 100 is illustrated. The apparatus 100 is provided for enhancing cooling of a high heat-generating vehicle component, such as a vehicle component which is found in a higher temperature cooling loop in an electric vehicle 10. The apparatus 100 finds particular application in conjunction with a heavy electric vehicle (either an all-electric or a hybrid) that uses compressed air to selectively control application of vehicle brakes and will be described with particular reference thereto.

The apparatus 100 includes a vehicle air compressor assembly 110 constructed in accordance with an embodiment. The air compressor assembly 110 may comprise any type of compressor, such as a single piston, a dual piston, or a screw. Other types of compressors are possible. The air compressor assembly 110 in a typical (i.e., non-special) vehicle braking application is a low-cycle (i.e., normally dormant) device.

The air compressor assembly 110 has a body 111 in which a reservoir 112 containing a liquid 114 is disposed. The reservoir 112 may contain any type of liquid associated with the air compressor assembly 110. As an example, the reservoir 112 may comprise an oil reservoir that contains oil for lubricating moving parts of the air compressor assembly 110. The air compressor assembly 110 also includes a heat exchanger 120 submerged at least in part in the oil 114 contained in the oil reservoir 112.

The air compressor assembly 110 further includes a reservoir interface that has an inlet port 132 disposed on one side 122 of the heat exchanger 120. The inlet port 132 is provided for receiving hot coolant via line 101 from a high heat-generating vehicle component 102. The reservoir interface also has an outlet port 134 disposed on an opposite side 124 of the heat exchanger 120. The outlet port 134 is provided for returning coolant that has been cooled by the heat exchanger 120 back via line 103 through a component radiator 104 and a component pump 106 to the vehicle component 102.

As an example, the vehicle component 102 comprises a subsystem in an electric drive train of the heavy electric vehicle 10. The vehicle component 102 includes, but is not limited to, a liquid-cooled inverter, or a motor or battery where removal of heat requires an external cooling system such as a radiator or an expander to remove heat energy from a coolant. The vehicle component 102 is other than a component of the air compressor assembly 110.

If the two lines 101, 103 shown in FIG. 1 were to be directly connected to each other (instead of through the air compressor assembly 110 via the inlet and outlet ports 132, 134), the circuit formed by the two connected lines, the component radiator 104, the component pump 106, and the vehicle component 102 form a conventional cooling loop for the vehicle component 102. However, in accordance with an aspect of the present disclosure, the two connected lines in the conventional cooling loop are cut so that one end (i.e., line 101) can be connected to the inlet port 132 of the reservoir interface and the other end (i.e., line 103) can be connected to the outlet port 134 of the reservoir interface. A bypass valve 108 is connected between line 101 and line 103. The bypass valve 108 opens to allow hot coolant to flow directly from line 101 to line 103 (i.e., bypassing the air compressor assembly 110) in the event of an over-temperature condition between line 101 and 103.

Figure 2:
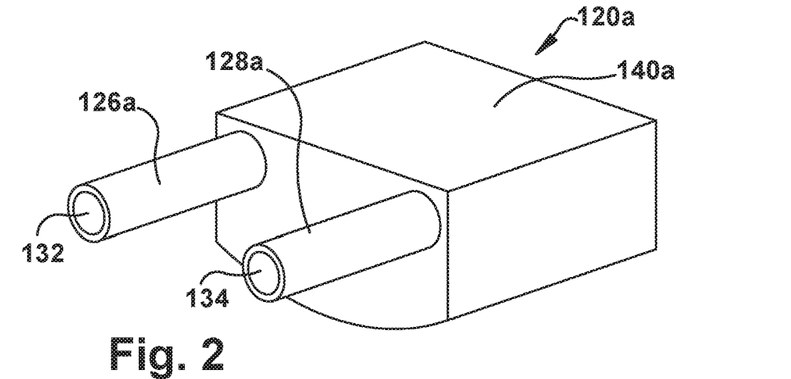
FIG. 2 is a perspective view of an example heat exchanger that can be used in the air compressor assembly of FIG. 1.

Referring to FIG. 2, a perspective view of an example heat exchanger 120a that can be used in the air compressor assembly 110 of FIG. 1 is illustrated. The heat exchanger 120a includes a first tube 126a that defines the inlet port 132 and a second tube 128a that defines the outlet port 134. The heat exchanger 120a also includes a substantially hollow body 140a that straddles the first and second tubes 126a, 128a to support and stabilize the two tubes 126a, 128a. The two tubes 126a, 128a are in fluid communication with each other through a hollowed-out chamber portion of the body 140a.

The hollow body 140a and the two tubes 126a, 128a may comprise any type of suitable heat-absorbing (i.e., heat-sinking) material that can be thermally coupled to the hot coolant loop of the vehicle component 102. Preferably, the hollow body 140a and the two tubes 126a, 128a are made of a material that efficiently absorbs heat energy away from the type of coolant that will be flowing from the vehicle component 102 (FIG. 1) via line 101 to the inlet port 132. The hollow body 140a and the two tubes 126a, 128a are submerged in the oil 114 contained in the oil reservoir 112.

Figure 3A:
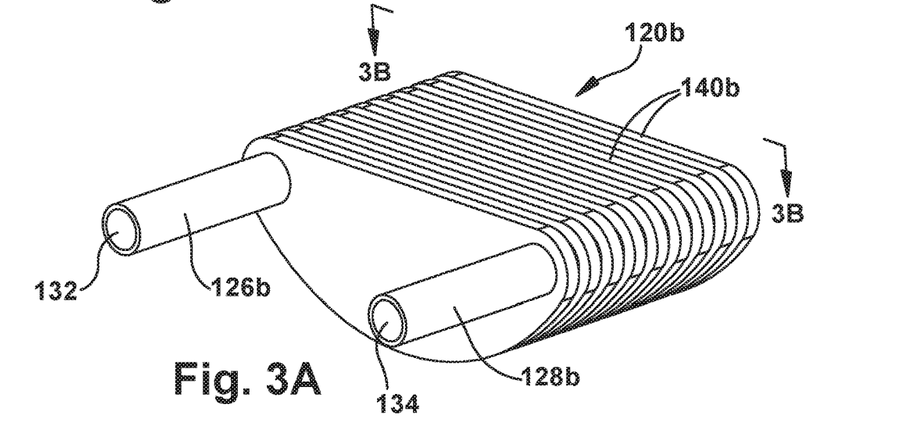
FIG. 3A is a perspective view similar to FIG. 2, and showing another example heat exchanger that can be used in the air compressor assembly of FIG. 1.
Figure 3B:
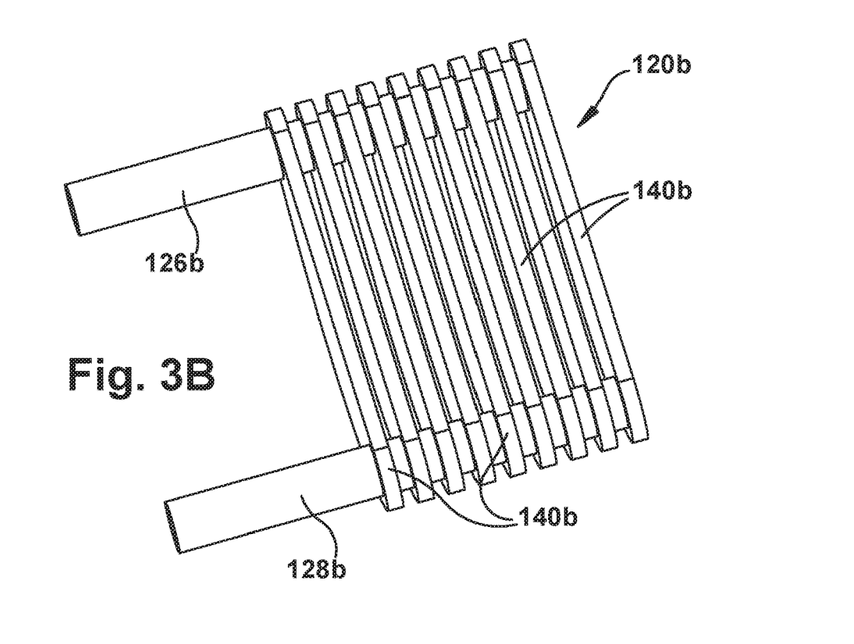
FIG. 3B is a perspective view, looking approximately in the direction of arrow "3B" of FIG. 3A, and showing details of the heat exchanger.
Figure 3C:
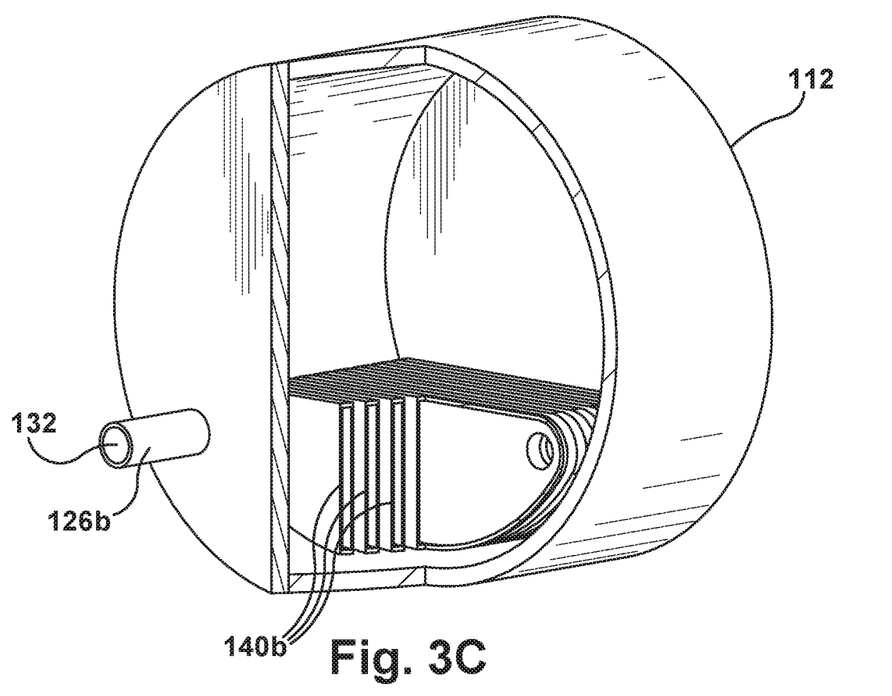
FIG. 3C is a perspective view, showing certain portions removed, of the heat exchanger of FIGS. 3A and 3B installed in an oil reservoir of the air compressor assembly.

Referring to FIG. 3A, a perspective view similar to FIG. 2 is illustrated. FIG. 3A shows another example heat exchanger 120b that can be used in the air compressor assembly 110 of FIG. 1. FIG. 3B is a perspective view, looking approximately in the direction of arrow "3B" of FIG. 3A, and shows details of the heat exchanger 120b. FIG. 3C is a perspective view, showing certain portions removed, of the heat exchanger 120b of FIGS. 3A and 3B installed in the oil reservoir 112 of the air compressor assembly 110. The heat exchanger 120b includes a first tube 126b that defines the inlet port 132 and a second tube 128b that defines the outlet port 134. The heat exchanger 120b also includes a plurality of hollowed-out fin members 140b that straddle the first and second tubes 126b, 128b to support and stabilize the two tubes 126b, 128b. The two tubes 126b, 128b are in fluid communication with each other through a hollowed-out chamber portion of each of the fin members 140b.

The plurality of fin-like members 140b and the two tubes 126b, 128b may comprise any type of suitable heat-absorbing material that can be thermally coupled to the hot coolant loop of the vehicle component 102. Preferably, the plurality of fin-like members 140b and the two tubes 126b, 128b are made of a material that efficiently absorbs heat energy away from the type of coolant that will be flowing from the vehicle component 102 via line 101 to the inlet port 132. The plurality of fin-like members 140b and the two tubes 126b, 128b are submerged in the oil 114 contained in the oil reservoir 112. Since the hot coolant from the vehicle component 102 flows tangentially to surfaces of the plurality of fin-like members 140b, back pressure on the hot coolant is reduced.

Figure 4A:
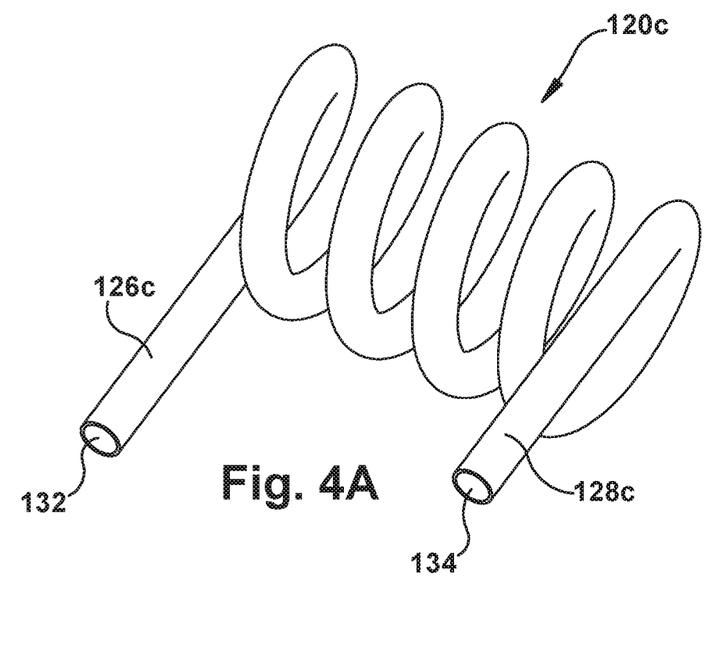
FIG. 4A is a perspective view of an example heat exchanger in the form of a spiral-shaped metal conduit that can be used in the air compressor assembly of FIG. 1.
Figure 4B:
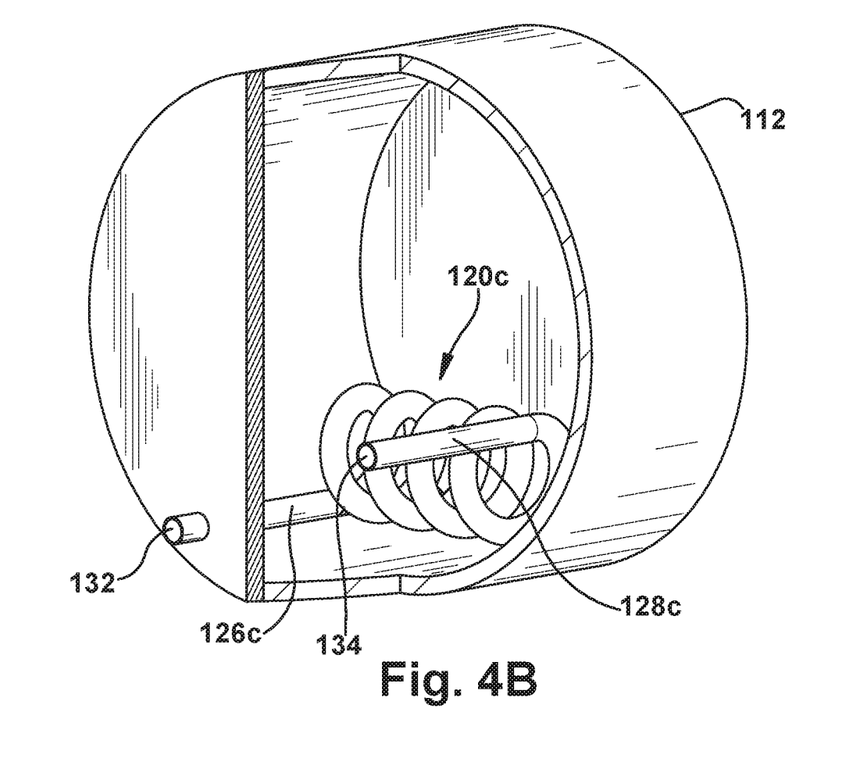
FIG. 4B is a perspective view, showing certain portions removed, of the heat exchanger of FIG. 4A installed in an oil reservoir of the air compressor assembly.

Referring to FIG. 4A, a perspective view of an example heat exchanger in the form of a coil-shaped metal conduit 120c that can be used in the air compressor assembly 110 of FIG. 1 is illustrated. FIG. 4B is a perspective view, showing certain portions removed, of the heat exchanger 120c of FIG. 4A installed in the oil reservoir 112 of the air compressor assembly 110. More specifically, the coil-shaped metal conduit 120c shown in FIGS. 4A and 4B is spiral-shaped and is configured to receive a hot liquid coolant from the vehicle component 102. Alternatively, the spiral-shaped metal conduit 120c may be configured to receive a hot gaseous coolant from the vehicle component 102.

One end 126c of the spiral-shaped metal conduit 120c defines the inlet port 132, and the other end 128c of the spiral-shaped metal conduit 120c defines the outlet port 134. When hot coolant flows from the vehicle component 102 through the spiral-shaped metal conduit 120c, the heat energy in the hot coolant is transferred through thickness of the metal conduit 120c to the oil 114 contained in the oil reservoir 112.

Figure 5A:
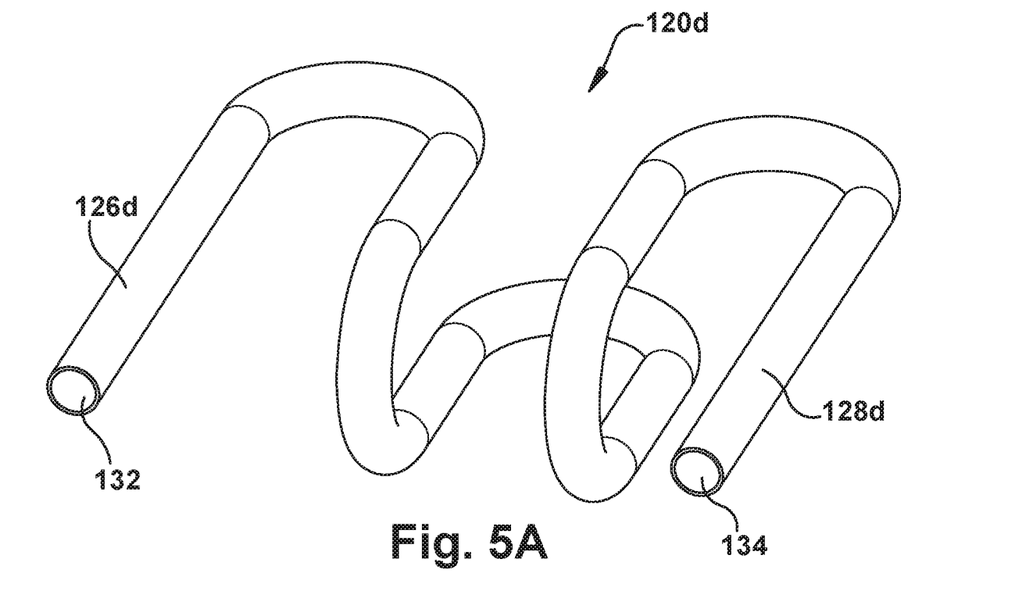
FIG. 5A is a perspective view of an example heat exchanger in the form of an irregular-shaped metal conduit that can be used in the air compressor assembly of FIG. 1.
Figure 5B:
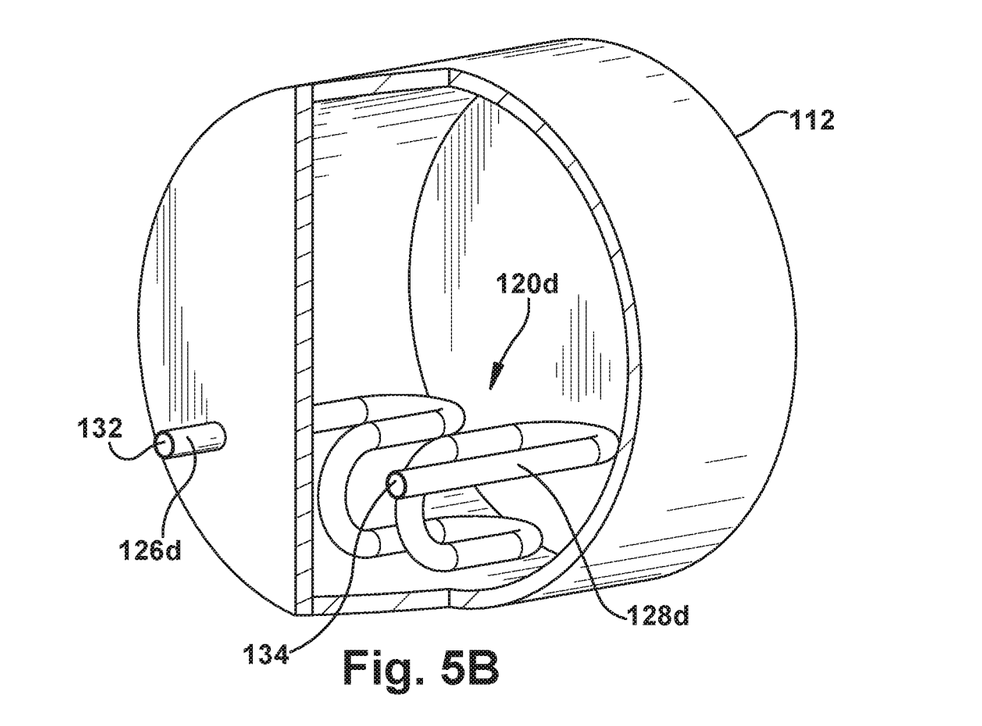
FIG. 5B is a perspective view, showing certain portions removed, of the heat exchanger of FIG. 5A installed in an oil reservoir of the air compressor assembly.

Referring to FIG. 5A, a perspective view of another example heat exchanger in the form of a coil-shaped metal conduit 120d that can be used in the air compressor assembly 110 of FIG. 1 is illustrated. FIG. 5B is a perspective view, showing certain portions removed, of the heat exchanger 120d of FIG. 5A installed in the oil reservoir 112 of the air compressor assembly 110. More specifically, the coil-shaped metal conduit 120d shown in FIGS. 5A and 5B is irregular-shaped and is configured to receive a hot liquid coolant from the vehicle component 102. Alternatively, the irregular-shaped metal conduit 120d may be configured to receive a hot gaseous coolant from the vehicle component 102.

One end 126d of the irregular-shaped metal conduit 120d defines the inlet port 132, and the other end 128d defines the outlet port 134. When hot coolant flows from the vehicle component 102 through the irregular-shaped metal conduit 120d, the heat energy in the hot coolant is transferred through thickness of the metal conduit 120d to the oil 114 contained in the oil reservoir 112.

Figure 6:
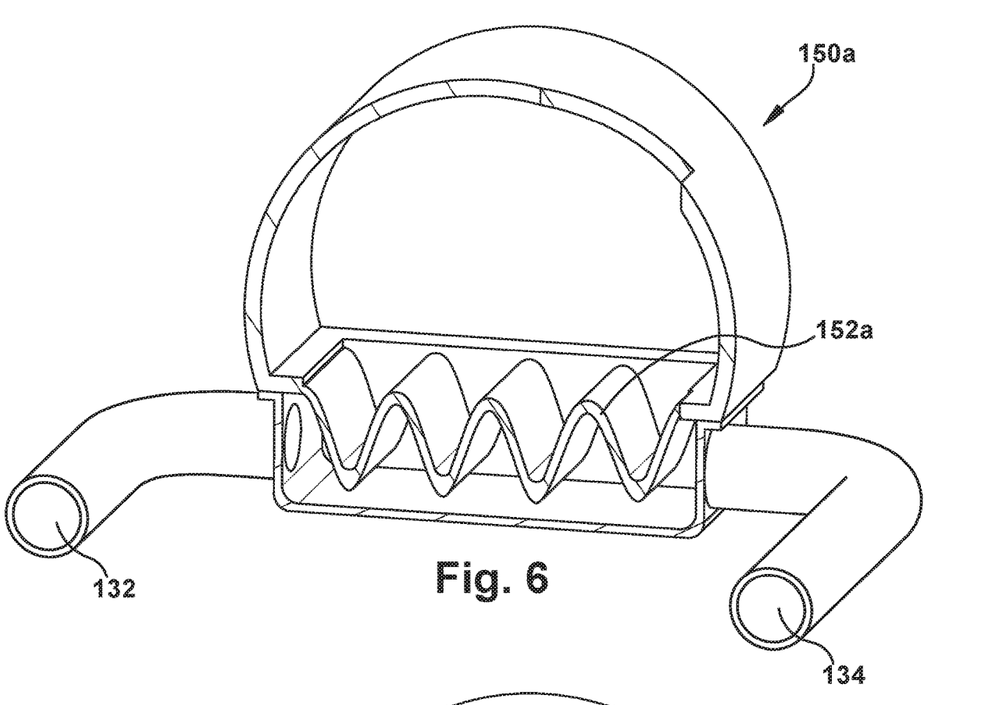
FIG. 6 is an enlarged perspective view of an example reservoir body portion, designated with a small dashed circle marked "6" in FIG. 1, which can be used in the air compressor assembly of FIG. 1.

Referring to FIG. 6, an enlarged perspective view, designated with a small dashed circle marked "6" in FIG. 1, of an example reservoir body portion 150a that can be used in the air compressor assembly 110 of FIG. 1 is illustrated. More specifically, the reservoir body portion 150a includes surface convolutions 152a (i.e., undulations) which are arranged to absorb heat energy from the oil 114 contained in the oil reservoir 112 and transfer the absorbed heat energy to the reservoir body portion 150a. The body 111 (FIG. 1) of the air compressor assembly 110 has a profile which conforms to the surface convolutions 152a of the reservoir body portion 150a.

The surface convolutions 152a are positioned such that the hot coolant from the vehicle component 102 follows a flow path along the surface convolutions 152a in an undulating manner. The surface convolutions 152a provide a much larger surface area over which heat energy in the oil 114 in the oil reservoir 112 can be absorbed into the reservoir body portion 150a and subsequently into the body 111 of the air compressor assembly 110. This transfer of heat energy away from the oil 114 in the oil reservoir 112 further enhances cooling of the vehicle component 102.

Figure 7:
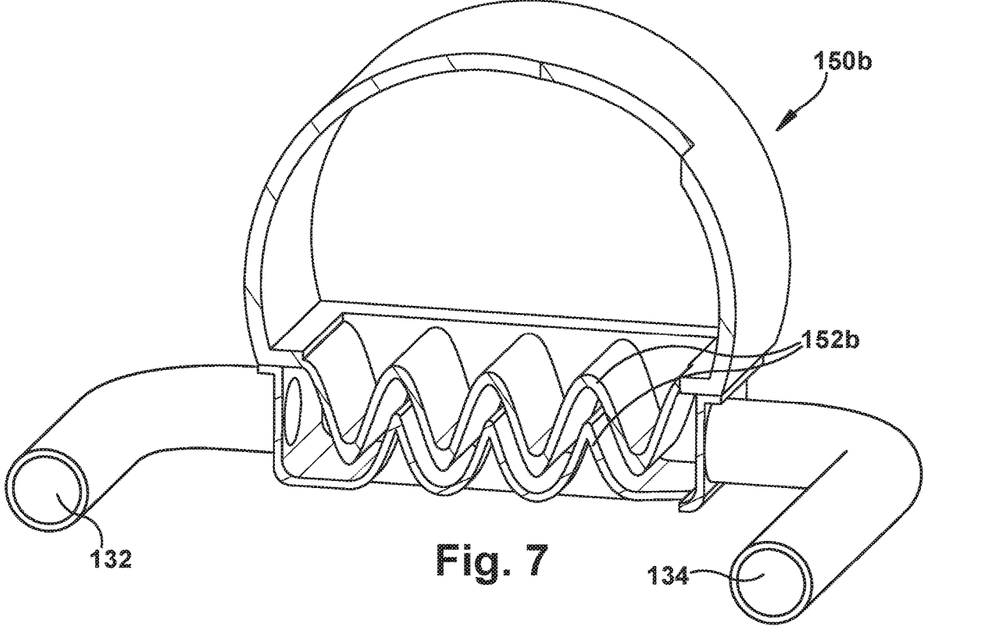
FIG. 7 is an enlarged perspective view similar to FIG. 6, and showing another example reservoir body portion that can be used in the air compressor assembly of FIG. 1.

Referring to FIG. 7, an enlarged perspective view similar to FIG. 6 is illustrated. FIG. 7 shows another example reservoir body portion 150b that can be used in the air compressor assembly 110 of FIG. 1. More specifically, the reservoir body portion 150b includes dual surface convolutions 152b (i.e., dual surface undulations) which are arranged to absorb heat energy from the oil 114 contained in the oil reservoir 112. The dual surface undulations 152b provide a much larger surface over which heat energy in the oil 114 in the oil reservoir 112 can be absorbed into the reservoir body portion 150b and subsequently into the body 111 of the air compressor assembly 110. The dual surface undulations 152b not only help with controlling the hot fluid flow, but also helps with transferring heat energy away from the oil 114 in the oil reservoir 112. This transfer of heat energy away from the oil 114 in the oil reservoir 112 further enhances cooling of the vehicle component 102.

The air compressor assembly 110 is operable in a heat-generating mode in which the air compressor assembly 110 has a relatively lower capability to absorb heat energy from the vehicle component 102 to provide cooling of the vehicle component 102. The air compressor assembly 110 is also operable in a non-heat-generating mode in which the air compressor assembly 110 has a relatively higher capability to absorb heat energy from the vehicle component 102 to provide enhanced cooling of the vehicle component 102.

More specifically, the heat-generating mode includes a first heat-generating mode in which component parts of the air compressor assembly 110 are generating heat and delivering compressed air. The air compressor assembly 110 absorbs less heat energy from the vehicle component 102 to decrease cooling of the vehicle component 102 when component parts of the air compressor assembly 110 are delivering compressed air. The heat-generating mode also includes a second heat-generating mode in which component parts of the air compressor assembly 110 are generating heat and not delivering compressed air. The air compressor assembly 110 absorbs more heat from the vehicle component 102 to increase cooling of the vehicle component 102 when component parts of the air compressor assembly 110 are not delivering compressed air.

Although the above description describes heat energy being transferred from the hot coolant of the vehicle component 102 to the oil 114 via the heat exchanger 120 and then from the oil 114 to the body 111 of the air compressor assembly 110, it is conceivable that heat energy also be transferred from the oil 114 to a low-temperature compressor cooling system found in many known air compressor assemblies. For example, as shown in FIG. 1, the vehicle component cooling apparatus 100 may further comprise an actuatable, low-temperature compressor cooling system 160 which includes a temperature valve 162, a compressor heat exchanger 164, a compressor radiator 166, and a compressor pump 168. Structure and operation of the low-temperature compressor cooling system 160 for air compressor assemblies are known and conventional and, therefore, will not be described in detail.

When actuated, the parts of the compressor cooling system 160 cooperate together to absorb heat energy from the oil 114 to provide auxiliary cooling (i.e., to increase cooling) of the oil 114 in the oil reservoir 112. For example, the parts can be selected such that the temperature valve 162 opens at a predetermined temperature threshold to maintain the temperature of the oil 114 below a certain value. This capability to select parts allows the amount of heat energy transferred from the hot coolant of the vehicle component 102 to the oil 114 to be controlled as desired for a particular application. Accordingly, this transfer of heat energy away from the oil 114 in the oil reservoir 112 using the compressor cooling system 160 can be controlled to even further enhance cooling of the vehicle component 102.

The air compressor assembly 110 comprises a structure which provides a secondary cooling mechanism that augments cooling of the vehicle component 102 by its primary cooling mechanism (i.e., the radiator 104 and the pump 106 shown in FIG. 1). The second cooling mechanism is thermally coupled to the primary cooling mechanism and comprises the heat-absorbing portion of the air compressor assembly 110. The low-temperature compressor cooling system 160 that is associated with the air compressor assembly 110 provides a tertiary cooling mechanism (i.e., the radiator 166 and the pump 168 shown in FIG. 1) that augments cooling of the vehicle component 102 by the primary and secondary cooling mechanisms to enhance cooling of the high heat-generating vehicle component. The bypass valve 108, when actuated, enables the secondary and tertiary cooling mechanisms to be bypassed such that the vehicle component 102 is cooled by only the primary cooling mechanism.

It should be apparent that the above-described vehicle component cooling apparatus 100 enables heat energy to be transferred away from the vehicle component 102 and dissipated within the air compressor assembly 110. The mass and heat dissipation characteristics of the air compressor assembly 110 function as a heat sink to draw heat energy away from the vehicle component 102. The air compressor assembly 110 naturally maintains a body temperature that is about 10 degrees C. less than the temperature of the hot coolant received from the vehicle component 102.

In some embodiments, the air compressor assembly 110 is operative to draw heat energy away from the vehicle component 102 when temperature of the hot coolant received from the vehicle component 102 is in a temperature range between about −30 degrees C. and about +70 degrees C. and environmental conditions are cooler than the temperature of the hot coolant.

In some embodiments, the air compressor assembly 110 is operative to expel heat energy from the air compressor assembly 110 to the low-temperature compressor cooling system 160 when the temperature of the hot coolant received from the vehicle component 102 is about +70 degrees C.

It should also be apparent that the oil 114 contained in the oil reservoir 112 absorbs heat energy generated by component parts of the air compressor assembly 110 during operation of the air compressor assembly 110, and absorbing heat energy generated by component parts of a vehicle component 102 during operation of the vehicle component 102. The oil 114 has a reduced heat-absorbing capability to absorb heat energy from the vehicle component 102 when component parts of the air compressor assembly 110 are generating heat and delivering compressed air. The oil 114 has an increased heat-absorbing capability to absorb heat energy from the vehicle component 102 when component parts of the air compressor assembly 110 are not generating heat and not delivering compressed air. The oil 114 has a heat-absorbing capability that is between the reduced heat-absorbing capability and the increased heat-absorbing capability to absorb heat energy from the vehicle component 102 when component parts of the air compressor assembly 110 are generating heat and not delivering compressed air It should also be apparent that the heat energy transferred away from the vehicle component 102 is considered a "waste heat" generated by operation of the vehicle component 102. While the wasted heat is being dissipated within the air compressor assembly 110 to enhance cooling of the vehicle component 102, the operation of the air compressor assembly 110 also benefits by using this wasted heat to operate more efficiently in a "pre-heated" startup (i.e., a warmed-up state) each time the air compressor assembly 110 turns on.

It should further be apparent that the air compressor assembly 110 is a low-duty cycle device (i.e., a normally-dormant device) that provides an additional heat sinking capacity for absorbing heat energy from high heat-generating components. This additional heat sinking capacity provided by the air compressor assembly 110 lowers the temperature of the hot coolant that reaches the inlets of the devices (e.g., the component radiator 104 and the component pump 106 shown in FIG. 1) in the cooling loop of the high heat-generating vehicle component 102. As a result, this lowers the amount of energy consumed by these devices to lower the temperature required at the inlets of the devices. Moreover, the amount of energy consumed by the air compressor assembly 110 is lowered since it is starting up from a warmed-up state when it is turned on. Thus, energy is not only being saved during operation of the devices in the coolant loop of the high heat-generating vehicle component 102, but also by operation of the air compressor assembly 110 when it is needed.

Figure 8:
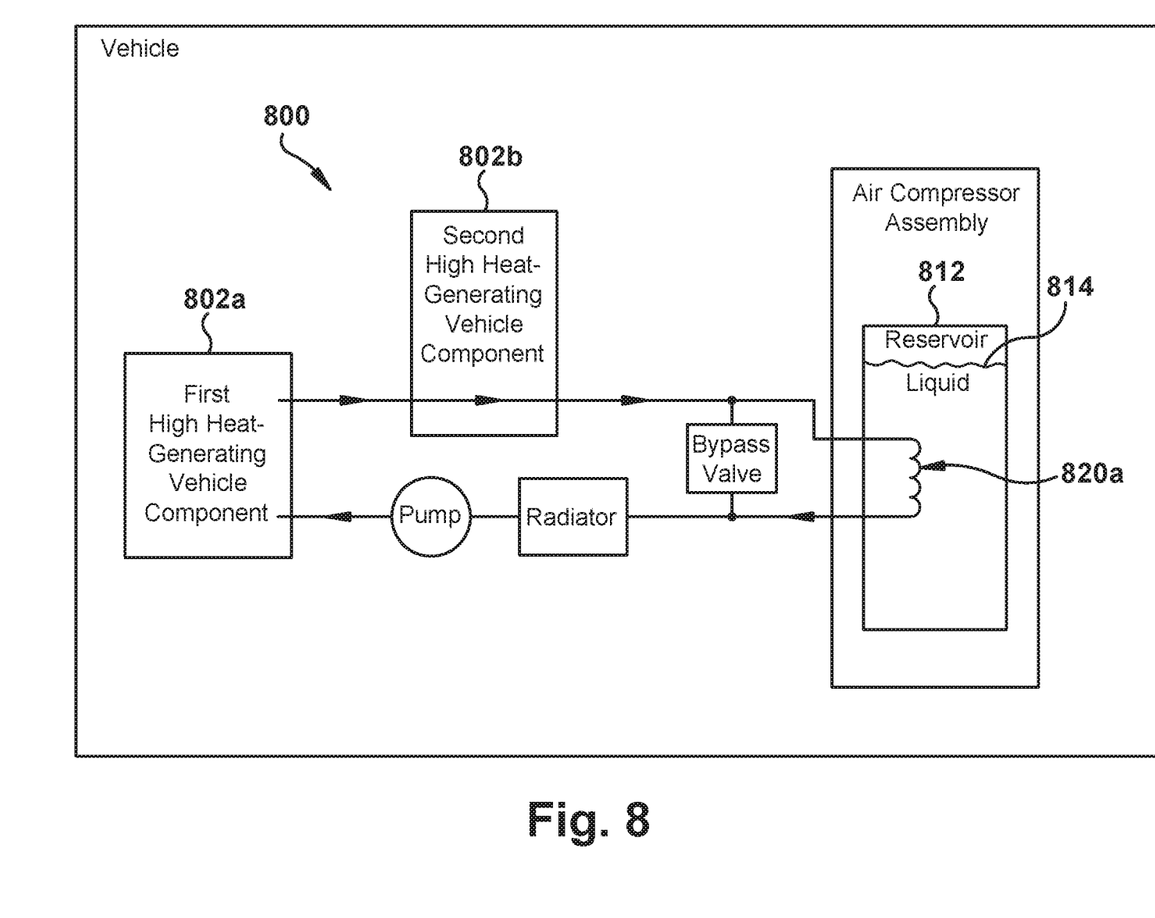
FIG. 8 is a schematic diagram showing an example vehicle component cooling apparatus in accordance with another embodiment.

Referring to FIG. 8, a schematic diagram showing an example vehicle component cooling apparatus 800 in accordance with another embodiment is illustrated. The apparatus 800 shown in FIG. 8 is similar to the apparatus 100 shown in FIG. 1, except that the apparatus 800 of FIG. 8 has a first high heat-generating vehicle component 802a and a second high heat-generating vehicle component 802b transferring heat energy to a heat exchanger 820a. The heat exchanger 820a is submerged in oil 814 in an oil reservoir 812.

The temperature of the oil 814 in the oil reservoir 812 increases due to heat energy transferred from the first high heat-generating vehicle component 802a and heat energy transferred from the second high heat-generating vehicle component 802b. In some embodiments, the temperature of the hot coolant from the first and second high heat-generating components 802a, 802b is lowered no lower than about −30 degrees C. by transferring heat energy away from the hot coolant.

Figure 9:
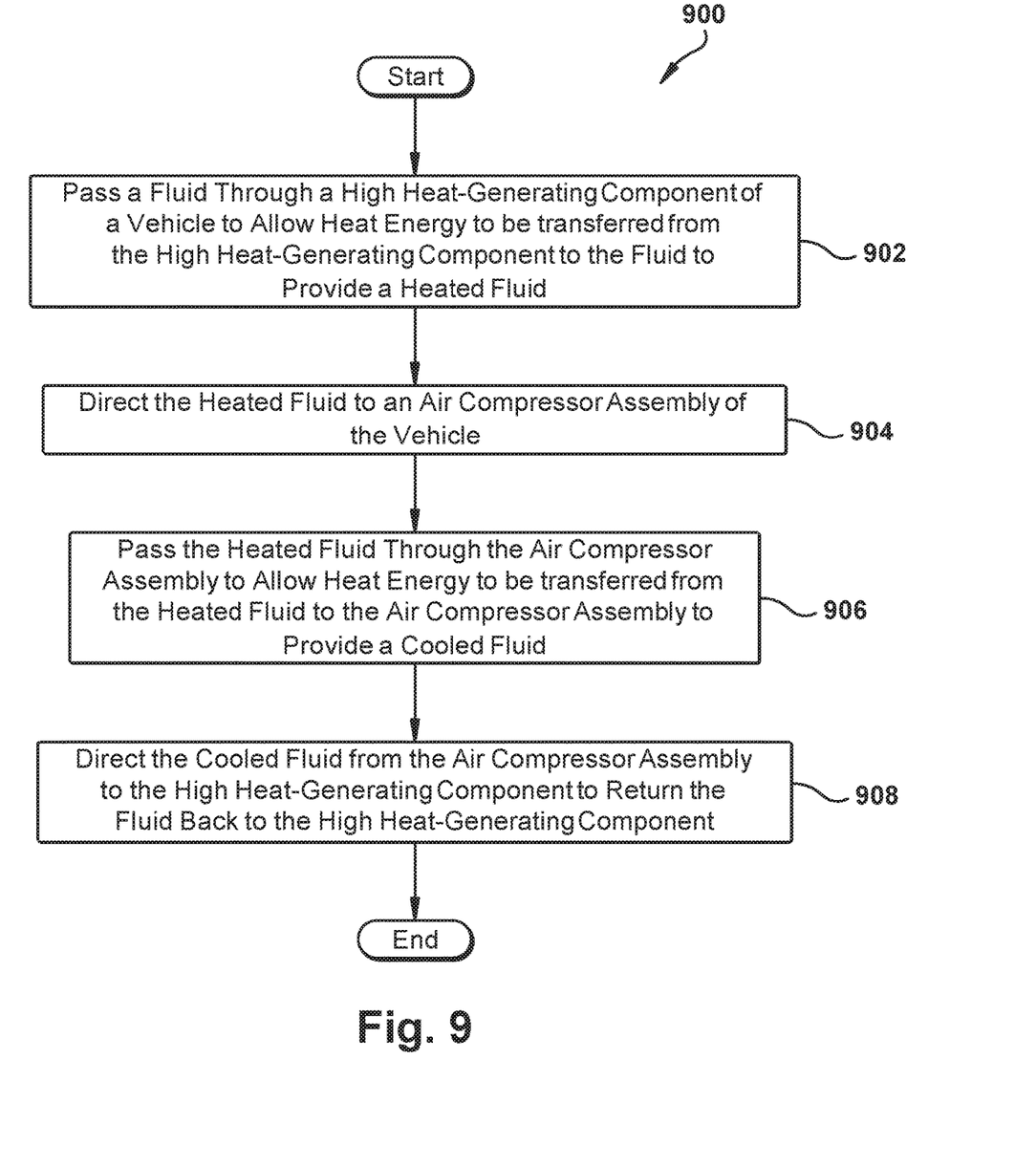
FIG. 9 is a flow diagram depicting an example method for a vehicle in accordance with an embodiment.

Referring to FIG. 9, a flow diagram 900 depicting an example method for a vehicle in accordance with an embodiment is illustrated. In block 902, a fluid is passed through a high heat-generating component of the vehicle to allow heat energy to be transferred from the high heat-generating component to the fluid to provide a heated fluid. Then, in block 904, the heated fluid is directed to an air compressor assembly of the vehicle. The heated fluid is passed through the air compressor assembly to allow heat energy to be transferred from the heated fluid to the air compressor assembly to provide a cooled fluid, as shown in block 906. The process then proceeds to block 908 in which the cooled fluid is directed from the air compressor assembly to the high heat-generating component to return the fluid back to the high heat-generating component. The process then ends.

In some embodiments, the heated fluid is passed through a heat exchanger of the air compressor assembly to allow heat energy to be transferred from the heated fluid to the heat exchanger to provide the cooled fluid.

In some embodiments, the method further comprises transferring heat energy from the heat exchanger of the air compressor assembly to a liquid contained in a reservoir of the air compressor assembly. In some embodiments, the heat energy is transferred from the heat exchanger of the air compressor assembly to a lubricating oil contained in an oil reservoir of the air compressor assembly.

In some embodiments, the method further comprises transferring heat energy from the oil contained in the oil reservoir to surface convolutions which are disposed on a body portion of the air compressor assembly.

In some embodiments, the method further comprises transferring heat energy from the oil contained in the oil reservoir to dual surface undulations which are disposed on a body portion of the air compressor assembly.

Figure 10:
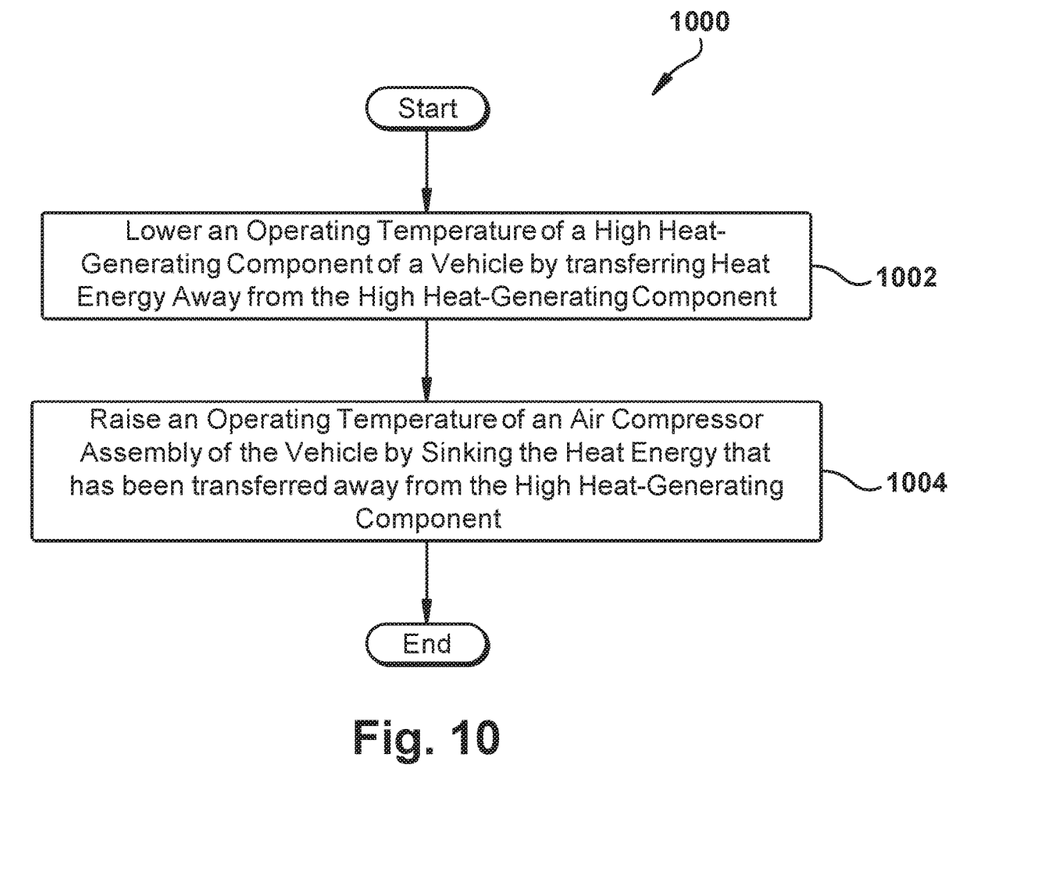
FIG. 10 is a flow diagram depicting an example method for a vehicle in accordance with another embodiment.

Referring to FIG. 10, a flow diagram 1000 depicting an example method for a vehicle in accordance with another embodiment is illustrated. In block 1002, an operating temperature of a high heat-generating component of the vehicle is lowered by transferring heat energy away from the high heat-generating component. Then, in block 1004, an operating temperature of an air compressor assembly of the vehicle is raised by sinking the heat energy that has been transferred away from the high heat-generating component. The process then ends.

In some embodiments, the temperature of hot coolant from the high heat-generating component is lowered no lower than about −30 degrees C. by transferring heat away from the hot coolant.

In some embodiments, the method further comprises expelling heat energy from the air compressor assembly to a low-temperature compressor cooling system when temperature of hot coolant received from the vehicle component is about +70 degrees C.

Although the above description describes an air compressor assembly of a vehicle braking application being used as a heat sink to absorb heat energy from a high heat-generating vehicle component, it is conceivable that other compressor assemblies having a sizeable heat-sinking mass can be used. For example, compressors for suspensions, or large volume compressors for bulk off-loading may be used. It is also conceivable that assemblies in applications other than vehicle braking applications or non-compressor type of assemblies may be used. For example, hydraulic pumps used in low-duty cycle applications (e.g., hydro-pneumatic suspension), or actuators for rail adapters on rail service vehicles may be used as a heat sink to absorb heat energy from a high heat-generating component.

Also, although the above-description describes the apparatus 100 being used in conjunction with subsystems in an electric drive train of an all-electric or hybrid vehicle, such as a heavy electric vehicle, it is conceivable that the apparatus 100 may be used in other types of heavy vehicles, such as busses for example.

A number of advantages result by providing an air compressor assembly in accordance with the above-described description. One advantage is that electricity is saved for the heavy electric vehicle. This savings in electricity provides additional driving range for the heavy electric vehicle. Engineering tests have indicated an increase of up to 3% in the driving range of the vehicle when comparing a vehicle with the above-described air compressor assembly and a vehicle without the air compressor assembly.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An apparatus for cooling a high heat-generating vehicle component having a coolant loop, the apparatus comprising:
an air compressor assembly including a heat-sinking portion that can be thermally coupled to the coolant loop to transfer heat energy away from the coolant loop to enhance cooling of the vehicle component, wherein the heat-sinking portion of the air compressor assembly includes (i) an inlet port connectable to a first portion of the coolant loop for receiving hot coolant from the vehicle component, (ii) an outlet port connectable to a second portion of the coolant loop for returning cooled coolant from the heat-sinking portion back to the vehicle component and (iii) an oil reservoir having a heat exchanger which is submerged in oil contained in the oil reservoir and arranged to absorb heat energy from the hot coolant received from the vehicle component.

2. An apparatus according to claim 1, wherein the heat exchanger comprises a hollowed-out body interconnecting the inlet and outlet ports and through which the hot coolant flows to allow heat energy to be transferred from the hot coolant through the body to the oil contained in the oil reservoir.

3. An apparatus according to claim 1, wherein the heat exchanger comprises a plurality of hollowed-out fin members interconnecting the inlet and outlet ports and through which the hot coolant flows to allow heat energy to be transferred from the hot coolant through the fin members to the oil contained in the oil reservoir.

4. An apparatus according to claim 1, wherein the heat exchanger comprises a coil-shaped metal conduit interconnecting the inlet and outlet ports and through which the hot coolant flows to allow heat energy to be transferred from the hot coolant through thickness of the metal conduit to the oil contained in the oil reservoir.

5. An apparatus according to claim 4, wherein the coil-shaped metal conduit comprises a spiral-shaped metal conduit.

6. An apparatus according to claim 4, wherein the coil-shaped metal conduit comprises an irregular-shaped metal conduit.

7. An apparatus according to claim 4, wherein the oil reservoir includes a body and surface convolutions which are arranged to absorb heat energy from the oil contained in the oil reservoir and transfer the absorbed heat energy to the body of the oil reservoir.

8. An apparatus according to claim 4, wherein the oil reservoir includes a body and dual surface undulations which are arranged to absorb heat energy from the oil contained in the oil reservoir and transfer the absorbed heat energy to the body of the oil reservoir.

9. A heavy electric vehicle comprising the apparatus of claim 1.

10. A method of operating a heavy electric vehicle using the apparatus of claim 1.

11. An apparatus for cooling a high heat-generating vehicle component, the apparatus comprising:
    an air compressor assembly including:
        a reservoir containing a liquid;
        a heat exchanger submerged at least in part in the liquid contained in the reservoir;
        an inlet port connected to one end of the heat exchanger and for receiving hot coolant from the vehicle component; and
    an outlet port connected to an opposite end of the heat exchanger and for returning coolant that has been cooled by the heat exchanger back to the vehicle component.

12. An apparatus according to claim 11, wherein the reservoir comprises an oil reservoir containing lubricating oil.

13. An apparatus according to claim 11, wherein the heat exchanger is configured to receive a hot liquid coolant from the vehicle component.

14. An apparatus according to claim 11, wherein the heat exchanger is configured to receive a hot gaseous coolant from the vehicle component.

15. An apparatus according to claim 11, wherein the heat exchanger comprises a hollowed-out body interconnecting the inlet and outlet ports and through which the hot coolant flows to allow heat energy to be transferred from the hot coolant through the body to the liquid contained in the reservoir.

16. An apparatus according to claim 11, wherein the heat exchanger comprises a plurality of hollowed-out fin members interconnecting the inlet and outlet ports and through which the hot coolant flows to allow heat energy to be transferred from the hot coolant through the fin members to the liquid contained in the reservoir.

17. An apparatus according to claim 11, wherein the heat exchanger comprises a coil-shaped metal conduit interconnecting the inlet and outlet ports and through which the hot coolant flows to allow heat energy to be transferred from the hot coolant through thickness of the metal conduit to the liquid contained in the reservoir.

18. An apparatus according to claim 17, wherein the coil-shaped metal conduit comprises a spiral-shaped metal conduit.

19. An apparatus according to claim 17, wherein the coil-shaped metal conduit comprises an irregular-shaped metal conduit.

20. An apparatus according to claim 11, wherein the reservoir includes a body and surface convolutions which are arranged to absorb heat energy from the liquid contained in the reservoir and transfer the absorbed heat energy to the body of the reservoir.

21. An apparatus according to claim 11, wherein the reservoir includes a body and dual surface undulations which are arranged to absorb heat energy from the liquid contained in the reservoir and transfer the absorbed heat energy to the body of the reservoir.

22. An apparatus according to claim 11, wherein the air compressor assembly is operative to draw heat energy away from the vehicle component when temperature of the hot coolant received from the vehicle component is in a temperature range between about −30 degrees C. and about +70 degrees C. and environmental conditions are cooler than the temperature of the hot coolant.

23. An apparatus for cooling a high heat-generating vehicle component, the apparatus comprising:
    an air compressor assembly; and
    means interconnecting the vehicle component and the air compressor assembly and for enabling heat energy to be transferred away from the vehicle component and dissipated within the air compressor assembly, wherein the interconnecting means includes an inlet port connectable to a first fluid conduit associated with the vehicle component and for enabling hot coolant to flow from the vehicle component to the air compressor assembly, an outlet port connectable to a second fluid conduit associated with the vehicle component and for enabling cooled coolant to be returned from the air compressor back to the vehicle component, a heat exchanger connected between the inlet and outlet ports, and a reservoir containing a liquid in which the heat exchanger is submerged.

24. An apparatus according to claim 23, wherein the air compressor assembly is operative to draw heat energy away from the vehicle component when temperature of a hot coolant received from the vehicle component is in a temperature range between about −30 degrees C. and about +70 degrees C. and environmental conditions are cooler than the temperature of the hot coolant.

25. An apparatus according to claim 23, wherein the air compressor assembly is operative to expel heat energy from the air compressor assembly to a low-temperature compressor cooling system when temperature of a hot coolant received from the vehicle component is about +70 degrees C.

26. An apparatus for cooling at least one high heat-generating vehicle component, the apparatus comprising:
    a first high heat-generating vehicle component;
    an air compressor assembly including a heat-sinking portion coupled to the first high heat-generating vehicle component such that the heat-sinking portion increases in temperature due to heat energy transferred from the first high heat-generating component to the heat-sinking portion; and
    a second high heat-generating vehicle component, wherein the heat-sinking portion is coupled to the second high heat-generating vehicle component such that the heat-sinking portion of the air compressor assembly increases in temperature due to heat energy transferred from the first and second high heat-generating vehicle components to the heat-sinking portion, wherein temperature of a hot coolant from the first and second high heat-generating components is lowered no lower than about −30 degrees C. by transferring heat energy away from the hot coolant.

27. A method for a vehicle comprising:
    passing a fluid through a high heat-generating component of the vehicle to allow heat energy to be transferred from the high heat-generating component to the fluid to provide a heated fluid;
    directing the heated fluid to an air compressor assembly of the vehicle;
    passing the heated fluid through a heat exchanger of the air compressor assembly to allow heat energy to be transferred from the heated fluid to the heat exchanger of the air compressor assembly to provide a cooled fluid;

directing the cooled fluid from the air compressor assembly to the high heat-generating component to return the fluid back to the high heat-generating component;

transferring heat energy from the heat exchanger of the air compressor assembly to a lubricating oil contained in an oil reservoir of the air compressor assembly; and transferring heat energy from the oil contained in the oil reservoir to surface convolutions which are disposed on a body portion of the air compressor assembly.

28. A method according to claim 27 further comprising: transferring heat energy from the oil contained in the oil reservoir to dual surface undulations which are disposed on a body portion of the air compressor assembly.

29. An apparatus for enhancing cooling of a high heat-generating vehicle component that is cooled by a primary cooling mechanism, the apparatus comprising:

an air compressor assembly comprising a structure which provides a secondary cooling mechanism that augments cooling of the vehicle component by the primary cooling mechanism; wherein the structure of the air compressor assembly includes a heat exchanger, an inlet port connected to one side of the heat exchanger connectable to the vehicle component to receive hot coolant fluid from the vehicle component to allow the hot coolant fluid to be cooled through the heat exchanger to provide a cooled fluid, an outlet port connected to an opposite side of the heat exchanger connectable to the primary cooling mechanism of the vehicle component to return the cooled fluid through the primary cooling mechanism back to the vehicle component and an oil reservoir containing lubricating oil in which the heat exchanger is at least partially submerged.

30. An apparatus according to claim 29 further comprising:

an actuatable, low-temperature compressor cooling system associated with the air compressor assembly and for, when actuated, providing a tertiary cooling mechanism that augments cooling of the vehicle component by the primary and secondary cooling mechanisms.

31. An apparatus according to claim 30 further comprising:

an actuatable bypass valve for, when actuated, enabling the secondary and tertiary cooling mechanisms to be bypassed such that the vehicle component is cooled by the primary cooling mechanism.

32. An apparatus according to claim 29, wherein the heat exchanger comprises a hollowed-out body interconnecting the inlet and outlet ports and through which the hot coolant flows to allow heat energy to be transferred from the hot coolant through the body to the oil contained in the oil reservoir.

33. An apparatus according to claim 29, wherein the heat exchanger comprises a plurality of hollowed-out fin members interconnecting the inlet and outlet ports and through which the hot coolant flows to allow heat energy to be transferred from the hot coolant through the fin members to the oil contained in the oil reservoir.

34. An apparatus according to claim 29, wherein the heat exchanger comprises a coil-shaped metal conduit interconnecting the inlet and outlet ports and through which the hot coolant flows to allow heat energy to be transferred from the hot coolant through thickness of the metal conduit to the oil contained in the oil reservoir.

35. An apparatus according to claim 34, wherein the coil-shaped metal conduit comprises a spiral-shaped metal conduit.

36. An apparatus according to claim 34, wherein the coil-shaped metal conduit comprises an irregular-shaped metal conduit.

37. An apparatus according to claim 29, wherein the oil reservoir includes a body and surface convolutions which are arranged to absorb heat energy from the oil contained in the oil reservoir and transfer the absorbed heat energy to the body of the oil reservoir.

38. An apparatus according to claim 29, wherein the oil reservoir includes a body and dual surface undulations which are arranged to absorb heat energy from the oil contained in the oil reservoir and transfer the absorbed heat energy to the body of the oil reservoir.

39. An air compressor assembly comprising:

a reservoir containing a liquid for (i) absorbing heat energy generated by component parts of the air compressor assembly during operation of the air compressor assembly, and (ii) absorbing heat energy generated by component parts of a vehicle component during operation of the vehicle component; wherein a heat exchanger of the air compressor assembly is submerged at least in part in the liquid contained in the reservoir.

40. An air compressor assembly according to claim 39, wherein the liquid has a reduced heat-absorbing capability to absorb heat energy from the vehicle component when component parts of the air compressor assembly are generating heat and delivering compressed air.

41. An air compressor assembly according to claim 40, wherein the liquid has an increased heat-absorbing capability to absorb heat energy from the vehicle component when component parts of the air compressor assembly are not generating heat and not delivering compressed air.

42. An air compressor assembly according to claim 41, wherein the liquid has a heat-absorbing capability that is between the reduced heat-absorbing capability and the increased heat-absorbing capability to absorb heat energy from the vehicle component when component parts of the air compressor assembly are generating heat and not delivering compressed air.

43. An air compressor assembly according to claim 39, wherein the liquid comprises a compressor lubricating oil.

44. An air compressor assembly according to claim 43, wherein the oil has heat-transfer properties that are capable of drawing heat energy away from the vehicle component when temperature of a hot coolant received from the vehicle component is in a temperature range between about −30 degrees C. and about +70 degrees C. and environmental conditions are cooler than the temperature of the hot coolant.

45. An air compressor assembly according to claim 43, wherein the oil has heat-transfer properties that are capable of expelling heat energy from the air compressor assembly to a low-temperature compressor cooling system when temperature of the hot coolant received from the vehicle component is about +70 degrees C.

46. An air compressor assembly according to claim 43, wherein the oil has heat-transfer properties that are capable of lowering the temperature of the hot coolant no lower than about −30 degrees C. by transferring heat energy away from the hot coolant.

47. An air compressor assembly according to claim 43 further comprising:

an actuatable, low-temperature compressor cooling system associated with the air compressor assembly and for, when actuated, absorbing heat energy from the oil to cool the oil of the air compressor assembly.

* * * * *